United States Patent [19]
Velie

[11] 3,969,842
[45] July 20, 1976

[54] WATER INJECTION HEATER

[75] Inventor: Wallace W. Velie, Upland, Calif.

[73] Assignee: Scheu Manufacturing Company, Upland, Calif.

[22] Filed: Oct. 8, 1974

[21] Appl. No.: 513,070

[52] U.S. Cl. ................................ 47/2; 239/14; 239/136
[51] Int. Cl.² ................................................ A01G 13/00
[58] Field of Search .......... 239/2, 14, 132.3, 132.5, 239/430, 431, 77, 78, 136; 126/113, 59.5; 431/190, 338; 47/2

[56] References Cited
UNITED STATES PATENTS

| | | | |
|---|---|---|---|
| 1,358,084 | 11/1920 | Leigh | 239/14 |
| 1,501,509 | 7/1924 | Wright | 239/430 |
| 1,966,591 | 7/1934 | Mexis | 431/190 |
| 2,175,422 | 10/1939 | Yoshinaka | 239/14 |
| 2,651,178 | 9/1953 | Williams | 239/77 |
| 2,661,239 | 12/1953 | Tirrell | 239/77 |
| 3,069,091 | 12/1962 | Giesse et al. | 239/77 |
| 3,135,466 | 6/1964 | Reid | 239/77 |
| 3,515,121 | 6/1970 | Scheu | 126/59.5 |
| 3,640,266 | 2/1972 | Ernest | 126/113 |
| 3,814,574 | 6/1974 | Darley | 431/338 |

Primary Examiner—M. H. Wood, Jr.
Assistant Examiner—Richard A. Bertsch
Attorney, Agent, or Firm—Fleit & Jacobson

[57] ABSTRACT

A heater having a water injection system for increasing the water vapor content of the atmosphere and reducing the temperature of the exhaust products of the heater. A nozzle assembly located in the stack of the heater injects a fine spray of water into the hot exhaust gases and onto the hot stack surface.

5 Claims, 3 Drawing Figures

WATER INJECTION HEATER

BACKGROUND OF THE INVENTION

From the time of man's first cultivation of crops he has been at the mercy of the weather. Myriad schemes and devices have been employed to attempt to control the manner in which moisture and temperature affect cultivated land. A particular nemesis of cultivated land is the cold air which occurs naturally as the sun goes down. Particularly susceptible to the cool evening air are crops planted in the generally fertile valleys, since the warm air tends to rise and the cooler air tends to settle into the valleys. Furthermore, when it becomes so cool as to permit frost to form the crops are almost always destroyed. Over the years there have been various types of equipment used to prevent such crop damage, with the most successful being the simple combustion heater used to warm the surrounding air. Of course there are natural phenomena which also provide crop protection. Examples of these are fog, clouds, and atmospheric conditions wherein the dew point temperature is relatively high.

At present the most popular frost prevention system is to employ a series of combustion devices located in the cultivated area to heat the surrounding air. These are generally oil burning and produce relatively large amounts of hot air and hot exhaust products which act to prevent frost damage. However, a major problem existing with these combustion heaters relates to the fact that the hot air tends to rise and the cooler air tends to settle over the cultivated area. In other words, the hot air which is intended to keep the cooler air away from the crops tends to become more buoyant and to rise beyond the area intended for protection. This counter productive effect has been accepted as an inherent drawback in frost prevention systems, and most developmental work done in this area involves improved heater designs or automated systems of heaters.

SUMMARY OF THE INVENTION

The present invention related to apparatus used for crop frost protection. More particularly, it relates to an improved combustion type heater for use in such crop protection. The present invention was developed after noting the aforementioned ways in which nature itself provides protection without the expenditure of additional energy. These natural atmospheric processes involve high levels of moisture content in the air, and the greater the water vapor content in the atmosphere, i.e., the higher the dew point temperature, the greater the effectiveness in crop protection. Water vapor in the atmosphere acts to protect crops in at least two separate ways. The first is to reduce long wave radiation from the ground to space and hence lower the amount of heat loss, and secondly when the dew point temperature is reached, the water vapor condenses and thereby releases heat to the atmosphere. An important feature of the invention then is to increase the amount of water vapor in the atmosphere in the vicinity of crops to be protected. However, an even more important feature of the present invention is the recognition that the added water vapor must be in the gaseous state rather than the small droplet state. It must be noted that fog consists of small droplets of condensed water, and although fog can reduce radiation heat loss, it cannot provide the heat release effect of condensation since it has already condensed. The invention then acts to increase the water vapor content of the atmosphere by adding gaseous water vapor rather than small water droplets. Moreover, the invention recognizes that merely boiling water in an open pan, for example, creates steam or fog, i.e., water droplets, because the gaseous water vapor condenses when it comes in contact with the cold air around it. Accordingly, the invention acts to increase the water vapor in the atmosphere without boiling water or spraying fine liquid droplets in the air.

The present invention is intended for use with one of the combustion devices for heating the air surrounding crops, or the like, mentioned previously herein. The invention provides one or more spray nozzles located inside the stack of such a combustion heater. These nozzles are fed water at a predetermined rate and pressure and are caused to spray both into the column of hot exhaust gases and onto the hot inner stack surfaces as well. In this way the invention produces a column of hot gas containing water vapor and hot combustion products, usually $CO_2$ and $N_2$. The water vapor provided by the invention cannot condense, since it is at a temperature above the condensing temperature, i.e., above 212°F. This permits all the gases, both water vapor and exhaust, to diffuse or mix into the atmosphere and then to cool down while concurrently warming the atmosphere. An even further advantage is gained by the use of the invention if the ambient air is dry, i.e., the dew point temperature is below the actual temperature, then the diffusion, mixing, and cooling will take place at a rate such that the water vapor remains in the air and serves to raise the average dew point. The raising of the average dew point is exactly how nature itself provides frost protection and hence the invention, by use of added energy, serves also to provide local frost protection for crops.

It is therefore an object of the present invention to provide a means of frost protection for crops by warming and increasing the moisture content of the surrounding air.

It is another object of the present invention to provide water spraying apparatus in combination with a combustion device to provide crop frost protection.

It is a still further object of the present invention to provide a water spraying system in combination with a combustion heater to increase the water vapor content of the localized atmosphere.

DESCRIPTION OF THE PREFERRED EMBODIMENT

Figure 1:
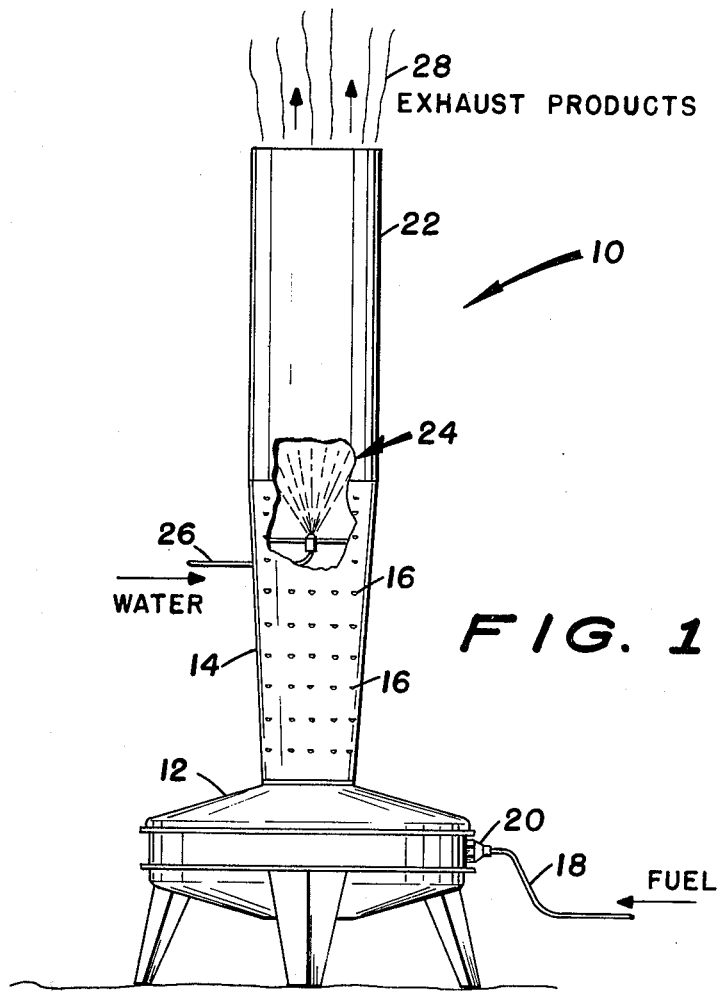
FIG. 1 is an elevation view of the combination of a combustion heater and water spray apparatus comprising the preferred embodiment of the invention.

Referring to FIG. 1 the preferred embodiment of the present invention is shown in pictorial form. One type of frost prevention combustion heater 10 utilizes a lower combustion chamber 12 which contains fuel and/or supports a small primary flame for fuel vaporization. Above this lower chamber 12 is a louvered stack 14 where a secondary flame serves to consume the vaporized fuel in the presence of air which is entering the louvers, shown typically at 16. Fuel is fed to the lower combustion chamber 12 by a fuel line 18 and is injected or sprayed into the chamber by a conventional fuel nozzle 20. Above the louvered stack or secondary combustion chamber 14, is an upper stack 22 which serves to increase the convection of the natural draft resulting from combustion. The invention increases the amount of gaseous water vapor in the atmosphere by introducing a fine spray of water into the combustion heater. The water is injected into the upper stack 22 by an internally mounted spray unit. A portion of the upper stack 22 is shown cut away, generally at 24, so that the spray unit may be seen. The spray unit is shown in more detail in FIG. 2. Water is fed in at a predetermined rate and pressure by an inlet supply pipe 26. The spray unit at 24 is located in the mating area of the upper and lower stacks 22 and 14, respectively, with the spray itself being directed upward. In this way the invention serves not only to reduce the temperature of the exhaust products 28 so that they will not be so bouyant as to rapidly rise away from the area of interest, but also to increase the moisture content of the atmosphere which provides frost protection as discussed above.

Figure 2:
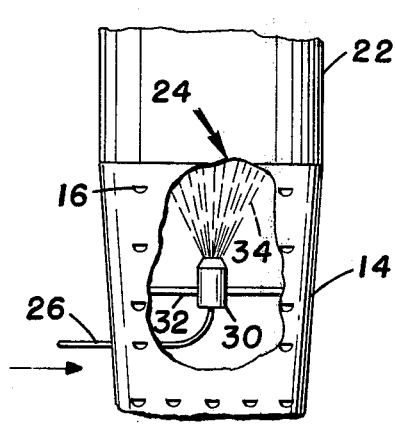
FIG. 2 is an elevation view of the portion of the stack of the heater showing the preferred embodiment of the invention in more detail.

Referring now to FIG. 2, the spray unit is shown in greater detail. The spray unit, shown generally at 24, comprises the inlet supply pipe 26, a spray nozzle 30, and a supporting bracket 32. The spray nozzle 30 is of a type such that a significant portion of water will be distributed onto the hot surface of the upper stack 22, as well as being distributed into the column of hot exhaust gases 28. By way of example, a 60° full cone spray pattern nozzle 30 can be used to vaporize about 6 gallons per hour at about 40 pounds per square inch of water pressure at the inlet line 26 with a heater burn rate of about 1 gallon per hour of number two diesel fuel. This burn rate equals approximately 140,000 BTU per hour. This means that approximately 40 percent of the heat is used to vaporize the water and about 20 percent of the heat is used to superheat the water vapor to the resultant exhaust product 28 temperature. Hence it may be seen that the embodiment of the invention has a relatively high effectiveness.

Figure 3:
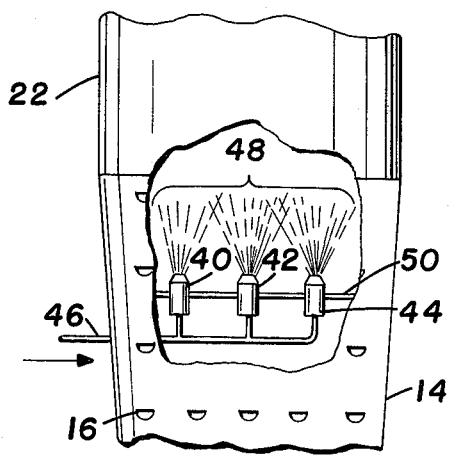
FIG. 3 is an elevation view of the portion of the stack of the heater showing another embodiment of the invention in detail.

Now, with regard to FIG. 3, a second embodiment of the spray unit of the present invention is shown. More particularly, the spray unit is mounted in the same location, i.e., in the area of the mating portions of the lower stack 14 and the upper stack 22, however here multiple nozzles are utilized. Three separate spray nozzles 40, 42 and 44 are connected to a water inlet supply pipe 46 or manifold and produce a spray pattern, shown generally at 48, which again is distributed onto the hot metallic surface of the upper stack 22 and into the column of hot exhaust products. These three nozzles 40, 42 and 44 are supported in the interior of the lower stack 14 by a mounting bracket 50 which is fastened at either end to the walls of the lower stack 14. These three nozzles 40, 42 and 44 are chosen so that in combination they provide a spray pattern 48 which will achieve the above-noted objectives.

It should be understood that the details of the foregoing embodiments are set forth by way of example only. Various types of combustion devices may be utilized in combination with other types of fluid spray apparatus. Accordingly, it is contemplated that this invention not be limited by the particular details of the embodiments as shown except as defined in the appended claims.

What is claimed is:

1. A heater comprising a primary combustion chamber for containing fuel and supporting a primary flame for fuel vaporization, a stack communicating with the interior of said primary combustion chamber, said stack having a plurality of louvers in the lower portion thereof adjacent said primary combustion chamber and forming a secondary combustion chamber wherein vaporized fuel is consumed in the presence of air entering said louvers, said stack further having an upper portion for increasing the convextion of the natural draft resulting from combustion, and water spray means mounted internally in said secondary combustion chamber and adapted to being connected to a pressurized water supply, said water injection means being directed upward for producing a water spray which is distributed into the combustion products to vaporize at least a portion of the water and produce a column of heated combustion products exiting said stack containing water which is substantially in the vapor state whereby the amount of water vapor in said combustion products is increased.

2. The apparatus of claim 1 wherein said water injection means comprises a spray nozzle located substantially at the mating area of the upper and lower portions of said stack.

3. The apparatus of claim 2 wherein said spray nozzle produces a 60° full cone spray pattern.

4. The apparatus of claim 1 wherein said water injection means comprises a plurality of water spray nozzles connected to said pressurized water supply.

5. The apparatus of claim 1 wherein said water injection means produces a water spray which impinges on the inner surface of said stack.

* * * * *